Nov. 10, 1931.   J. L. PRICE   1,831,079
BRAKE
Filed July 23, 1926
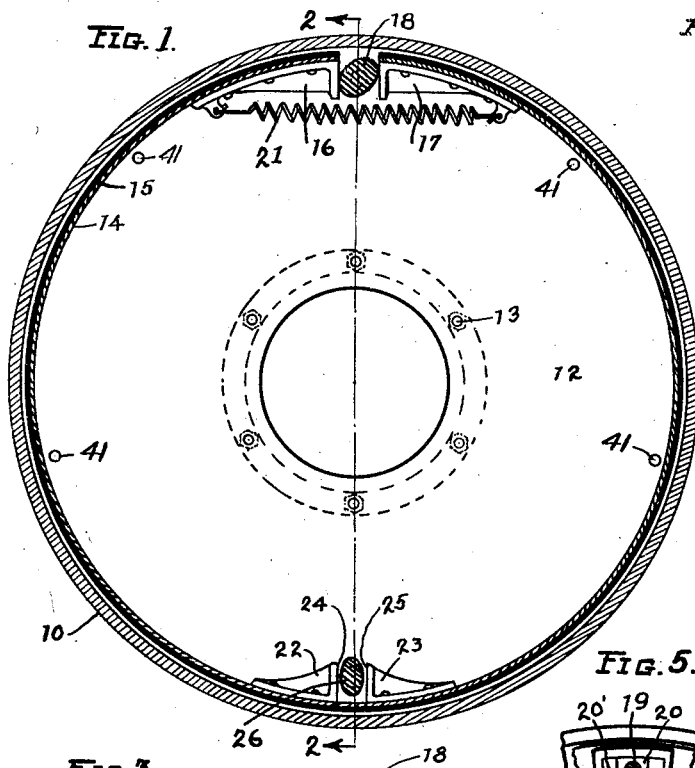
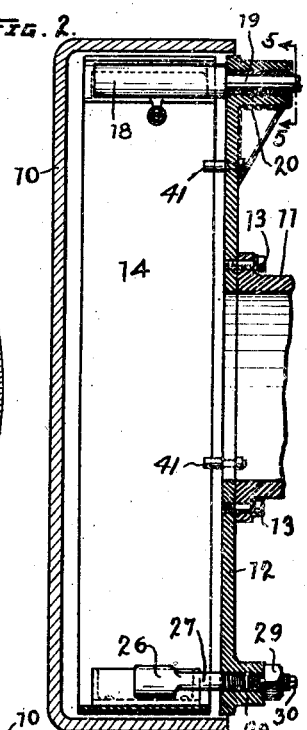
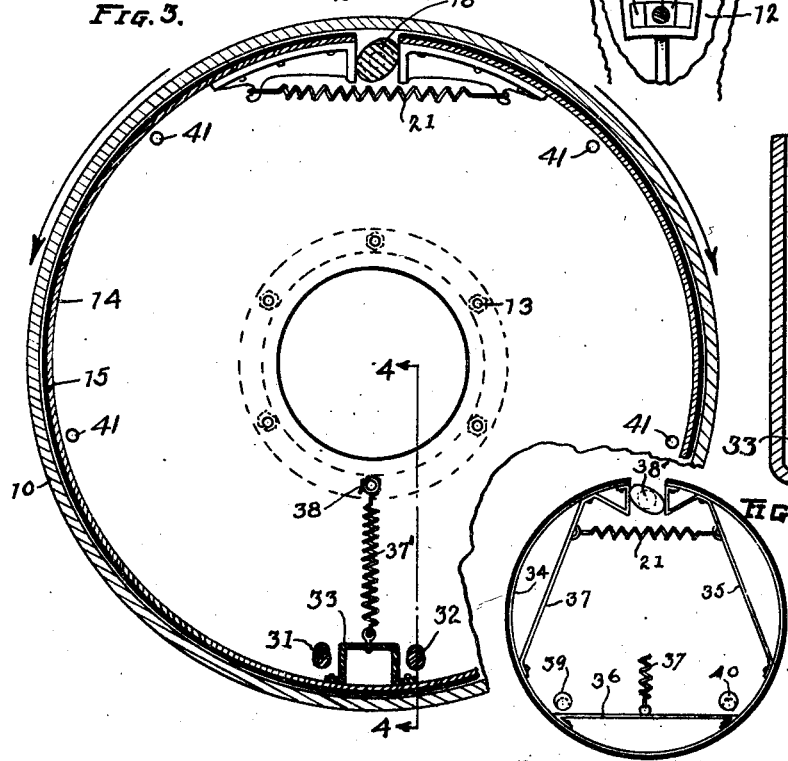
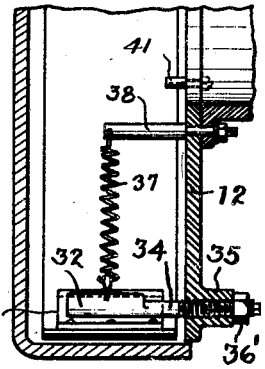
Inventor
JACOB L. PRICE.
Attorneys

Patented Nov. 10, 1931

1,831,079

UNITED STATES PATENT OFFICE

JACOB L. PRICE, OF NEW YORK, N. Y., ASSIGNOR, BY MESNE ASSIGNMENTS, TO BENDIX BRAKE COMPANY, OF SOUTH BEND, INDIANA, A CORPORATION OF ILLINOIS

BRAKE

Application filed July 23, 1926. Serial No. 124,335.

This invention relates to brakes for motor vehicles and more particularly to flexible band brakes of the internal expanding type.

It is one of the objects of the invention to provide means for controlling the self-applying action of the brake or, as it is sometimes called, the servo-action of the brake.

It is a further object of the invention to provide means for restricting the self-applying action to only a portion of the brake band and to thereby overcome one of the disadvantages of existing forms of internal band brakes which have been objectionable on account of the severity of the self-applying action, which has resulted in a "grabbing" effect of the band on the drum with which it cooperates.

Other objects of the invention and the features of novelty will be apparent from the following description taken in connection with the accompanying drawings, of which:

Fig. 1 is a side elevation of a brake drum having a brake, embodying my invention, assembled therewith;

Fig. 2 is a section on the line 2—2 of Fig. 1;

Fig. 3 is a view similar to Fig. 1 but showing a different form of the invention;

Fig. 4 is a section on the line 4—4 of Fig. 3;

Fig. 5 is a detail section on line 5—5 of Fig. 2; and

Fig. 6 is a view similar to Fig. 1, but illustrating another construction embodying the invention.

Referring to the drawings, 10 indicates a brake drum which is mounted on a wheel (not shown), so as to be rotatable therewith in the usual manner. An axle housing is indicated at 11 and has secured on the end thereof a dust-cover or spider 12, by means of bolts 13 or in any other suitable manner. A flexible band 14 cooperates with the interior of the drum 10 and may be provided with the usual lining 15 which is riveted on the exterior surface of the band 14. The ends of the band 14 carry brackets 16 and 17 which are riveted or otherwise secured thereto and are adapted to cooperate with an actuating cam 18, which is carried on a shaft 19 that is rotatably mounted in a bearing 20 which floats in the slot 20' in the spider 12. The brackets 16 and 17 are connected by a spring 21, in the usual manner, for normally holding the brackets against the cam 18 and to retract the band 14 from the drum when the brake is released.

The shaft 19 will be actuated from a control lever, according to the usual custom, and when the cam 18 is rotated for the purpose of engaging the band with the drum 10, one end portion or the other of the band will be subjected to a self-applying action, upon contacting with the brake drum, depending upon the direction in which the drum is rotated. For the purpose of controlling this self-applying action, I mount on the band, preferably adjacent the middle of its length, the brackets 22 and 23, in the form of the invention illustrated in Figs. 1 and 2. These brackets have faces 24 and 25, respectively, with which a cam 26 cooperates. The cam 26 is mounted on a threaded stem 27 which extends through a threaded opening in the boss 28, on the spider 12, and is locked in position by means of the nut 29. The outer end of the threaded stem 27 is preferably squared, as indicated at 30, to provide a convenient form of connection for a wrench for the purpose of adjusting the cam 26.

When the cam 18 is rotated to apply the brake, the engagement of one of the end portions of the band 14, with the drum, will tend to cause the band to rotate with the drum and thereby carry the cam 18 with it, due to the bearing 20 floating in the slot 20'. The rotation of the band 14 also carries one of the faces 24 or 25 against the cam 26, depending on the direction of rotation of the drum, this having the effect of limiting the circumferential movement of the band and also restricting the self-applying action to that portion of the band lying between the cam 18 and the cam 26, measured in the direction in which the drum is rotating. It will be obvious that the construction will be equally effective for controlling the circumferential movement of the band and also the self-applying effect, for either direction of rotation of the drum, and that the portion of the band on one side of the cam 26 will always be self-applying for one direction of rotation of the drum, and the opposite portion of the band will always be self-applying for the opposite direction of rotation of the drum.

The construction illustrated in Figs. 3 and 4 differs from the one illustrated in Figs. 1 and 2 in having two independently adjustable cams 31 and 32 which are arranged on opposite sides of a stop member 33, which is riveted or otherwise secured to the interior of the brake band. The cams 31 and 32 are each mounted on threaded stems 34 which engage threaded openings in bosses 35 on the spider 12 and are secured by means of lock nuts 36'. A spring 37' may be provided for the purpose of drawing the middle portion of the brake away from the drum, this spring having one end connected with the member 33 and its other end with a stud 38 on the spider 12.

In the form of the invention illustrated in Fig. 6, the band 34 is reinforced by the struts or braces 35, 36 and 37, in accordance with the invention described and claimed in my earlier application, Serial No. 96,376, filed March 22, 1926. The actuating cam 38' may be similar to the cam 18 and arranged to float with the band according to the construction illustrated in Figs. 1 and 2. Adjustable cams 39 and 40, similar to the cams 31 and 32, are provided and arranged to cooperate with the end portions of the strut 36 to limit the rotary movement of the band in either direction for the purposes previously described.

In each of the forms of the invention illustrated, guide pins 41 may be provided on the spider 12 for the purpose of confining the movements of the brake band.

Wear of the lining material 15, in each form of the invention, may be compensated for by adjusting the stop cam 26 of Figs. 1 and 2, or the cams 31 and 32 of Figs. 3 and 4, or the cams 39 and 40 of Fig. 6, so that, in this manner, the circumferential movement of the brake band may be controlled in accordance with the requirements of the situation.

While a cam has been shown and described as the actuating element, I do not want to limit myself to that means of spreading the ends of the brake band for the purpose of forcing the latter into contact with the drum; instead a toggle or other means may be used. For instance, a cylinder and piston actuated by hydraulic, pneumatic, electrical or vacuum means is also possible.

Having thus described my invention, I claim:

1. In brake mechanism, the combination of a drum, a continuous flexible band cooperating with the interior of said drum, and provided with a plurality of reinforcing struts each of which is connected with spaced points on the band, actuating means cooperating with the ends of said band and arranged to float circumferentially with the band, and adjustable means cooperating with the end portions of one of said struts to restrict the self-applying effect, due to engagement with said drum, to different sections of the band depending on the direction of rotation of the drum.

2. In brake mechanism, a continuous flexible band reinforced to form a plurality of segments, and a cooperative torque-taking means arranged adjacent the opposite ends of one of said segments.

3. In brake mechanism, a continuous flexible band reinforced by rigid struts to form a plurality of segments, each of which is flexible between the ends of its strut, and a cooperative torque-taking means arranged adjacent the opposite ends of one of said struts.

4. In brake mechanism, a continuous flexible band having a central segment reinforced, actuating means cooperating with the band and torque-taking means arranged adjacent opposite ends of said segment.

5. In brake mechanism, a continuous flexible band having separable ends and a reinforced central segment actuating means cooperating with the ends of the band and torque-taking means arranged adjacent the opposite ends of said segment, and a return spring co-operating with said torque-taking means to determine the released position of said segment.

6. In brake mechanism, a continuous flexible band having separable ends and a reinforced central segment, applying means acting on said ends and a pair of adjustable torque-taking devices arranged adjacent opposite ends of said segment.

7. In brake mechanism, a continuous flexible band having separable ends and having a reinforced central segment, applying means acting on said ends and a pair of torque-taking devices arranged adjacent opposite ends of said segment, and return spring acting on said segment between the torque-taking devices.

8. A brake comprising a continuous band, a segmental strut reinforcing the band and torque-taking means cooperating with the strut.

9. A brake comprising a continuous flexible band, segmental struts reinforcing the band and torque-taking means cooperating with one of the struts.

10. A brake comprising a one piece band, segmental strut reinforcing the band and torque-taking means co-operating with the respective ends with one of the struts.

11. A brake comprising a continuous flexible band, a plurality of segmental struts reinforcing the band to provide rigid bearing surfaces with intermediate flexible surfaces and torque-taking means co-operating with one of the struts.

In testimony whereof, I hereunto affix my signature.

JACOB L. PRICE.